United States Patent
Edwards (10) Patent No.: US 9,852,454 B2
(45) Date of Patent: Dec. 26, 2017

(54) TIME MULTIPLEXING POS FOR INAISLE SCANNING

(75) Inventor: Thomas V. Edwards, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 618 days.

(21) Appl. No.: 13/250,392

(22) Filed: Sep. 30, 2011

(65) Prior Publication Data

US 2013/0085879 A1    Apr. 4, 2013

(51) Int. Cl.
*G06Q 30/02* (2012.01)
*G06Q 30/06* (2012.01)

(52) U.S. Cl.
CPC ..... *G06Q 30/0281* (2013.01); *G06Q 30/0283* (2013.01); *G06Q 30/06* (2013.01)

(58) Field of Classification Search
CPC .......... G06Q 30/0281; G06Q 30/0283; G06Q 30/06; G06Q 30/0601; G07G 1/0081
See application file for complete search history.

(56) References Cited

U.S. PATENT DOCUMENTS

| | | | | |
|---|---|---|---|---|
| 5,557,088 A | * | 9/1996 | Shimizu et al. | 235/383 |
| 2004/0133477 A1 | * | 7/2004 | Morris et al. | 705/21 |
| 2007/0051801 A1 | * | 3/2007 | Garver | A47F 9/048 |
| | | | | 235/383 |

OTHER PUBLICATIONS

Dell Wyse—Press releases: "Wyse Technology Partners with Pippard to Create Virtualized POS System", dated Jan. 6, 2010. Retrieved online on May 13, 2016 from <<http://www.wyse.com/about/press/release/706?body=Search%20press%20releases&field_date_published_value%5Bvalue%5D%5Byear%5D=2010&view_name=press_releases&view_display_id=block_2&view_path=about%2Fpress%2Frelease&view_base_path=null&view_dom_id=1&pager_element=>>.*

\* cited by examiner

*Primary Examiner* — Hajime Rojas
(74) *Attorney, Agent, or Firm* — Schwegman, Lundberg & Woessner (57) ABSTRACT

Multiplexing techniques are addressed to allow multiple in store devices to share point of sale instances thereby reducing the overall number of point of sale instances employed. Customer scanning applications, such as price checking and phone based in aisle scanning are addressed.

15 Claims, 5 Drawing Sheets

FIG. 5

TIME MULTIPLEXING POS FOR INAISLE SCANNING

CROSS-REFERENCE TO RELATED APPLICATION

U.S. application Ser. No. 13/250,741, entitled "Standardizing Point of Sale Services and Leveraging Instances of the PLU Data" and filed on Sep. 30, 2011 is a related application and incorporated by reference herein in its entirety.

FIELD OF THE INVENTION

The present invention relates generally to improved methods and apparatus for providing accurate price data in a store context, and more particularly to advantageous techniques for multiplexing point of sale (POS) applications.

BACKGROUND OF THE INVENTION

POS pricing systems are well known in the grocery, retail and other store context. Such systems typically store a look up table of prices for all items to be sold. Upon purchase, a barcode on an item is scanned and the price is looked up. A POS terminal compiles a list of all items, their prices, and a total price is computed.

More and more stores are providing in aisle scanning devices to allow shoppers to check a price as they shop. Additionally, a wide variety of cell phone applications allow a user to use the camera on the phone to read a barcode and look up product information, competitors' pricing, and the like.

SUMMARY OF THE INVENTION

Among its several aspects, the present invention recognizes that one key to supporting in aisle scanning systems, phone based scanning and the like is accurate item pricing. Pretty much every store customer has had the unfortunate experience of misreading a shelf label or not seeing a shelf label and then having an item ring up at checkout for a higher price than expected. These experiences can be annoying, frustrating and embarrassing for the customer. From the store point of view, such events can be costly at several levels. First, they can bring the checkout process to a grinding halt as a clerk is sought to physically search, find the item and perform a price check. During busy store hours, the attendant delay can cause the line to back up and create a chain reaction of customer frustration leading to lost present and future sales. In aisle scanning can avoid such unwanted surprises, but only if the pricing retrieved is accurate.

A further aspect of the invention is recognizing that one common problem in providing in aisle scanning systems is getting accurate price information for the item just scanned. Because the pricing calculated can be effected by a wide variety of factors, such as the existence of a loyalty program, targeted marketing and coupons, store inventory conditions, special store promotions and many others, the only true authority for the price of an item is the store POS system running live against the actual store POS controller. Further, the correct transactional context must be maintained for each in aisle shopper to correctly address pricing discounts such as buy-one-get-one-half-off and the like. Matching each in aisle device with an instance of the POS pricing application is problematic in that for the POS to know that a total of two of the discountable items are now in the transaction in order to offer the correct discount for the second item is not easily scalable in that a large grocery store might have hundreds of in aisle scan devices, such as dedicated wireless scan devices, cellular smart phones, or the like, active at any point in time and would then potentially need to host that number of POS instances. Hosting such a large number of instances could be both challenging and costly since most POS systems are not easily run in a server configuration.

According to a further aspect, the present invention dramatically reduces the number of POS instances that are required by recognizing that the average scan time for an in aisle scanning customer is limited by the customer's rate of travel through the store and the average basket size of five to ten items per trip. Assuming ten minutes per shopping trip, the average scan time for a basket size of ten would be one scan per minute, even if every item selected was scanned, grossly under utilizing a POS instance that can typically sell items at a rate of five to ten items per second.

The present invention applies time multiplexing to the POS application allowing each POS instance to handle many in aisle scanning devices, such as cellular phones, wireless scanners, and the like.

A more complete understanding of the present invention, as well as further features and advantages of the invention, will be apparent from the following Detailed Description and the accompanying drawings.

DETAILED DESCRIPTION

Figure 1:
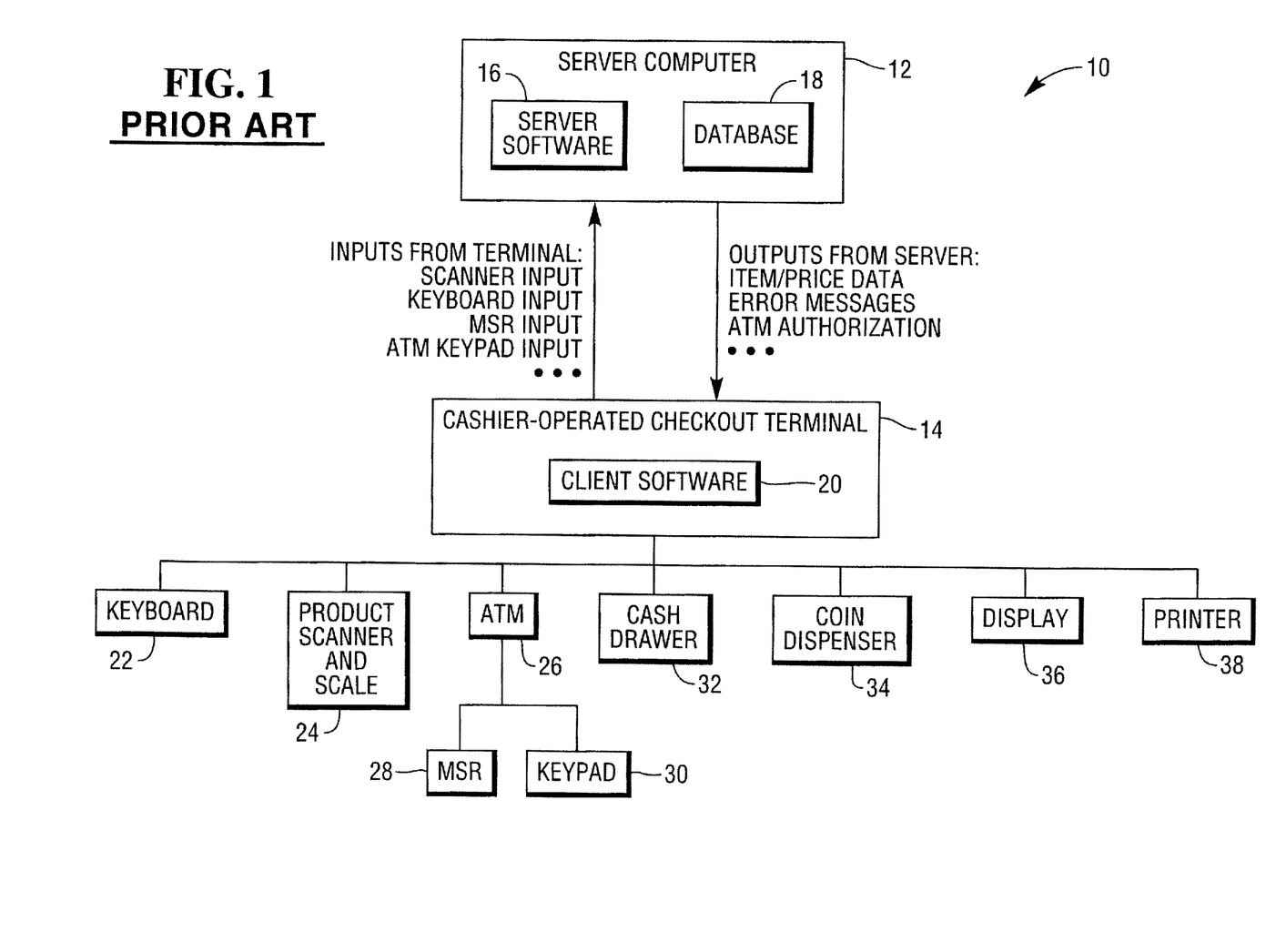
FIG. 1 shows an example of a prior art checkout system.

FIG. 1 shows a diagram of a retail checkout system 10 according to the prior art. The system 10 includes a server computer 12 and a cashier operated checkout terminal 14 connected to the server 12. The server 12 includes server software 16 and a database 18 containing information needed to perform the checkout function, including item codes, descriptions, prices, and the like. Server software typically includes an operating system, device drivers, a communication protocol stack, and runtime configuration tools. In addition, the server software may include applications such as electronic funds transfer (EFT), translation programs, an electronic journal (EJ) application, and back office functionality.

The checkout terminal 14 includes client software 20 for interacting with the server computer 12. The client software 20 also controls a number of input and output devices. These may suitably include a keyboard 22 for receiving inputs from a cashier, a product scanner and scale 24 for scanning UPC codes and weighing products, such as produce, an ATM machine 26 having a magnetic strip reader 28 and a keypad 30, a cash drawer 32, a coin dispenser 34, a display 36, and a receipt printer 38. Depending upon the needs of the particular retailer, other configurations of devices may be used.

During a typical retail transaction, the checkout terminal 14 receives inputs from the various peripheral devices and passes these inputs to the server computer 12 along with an appropriate request for information. In response to the request, the server computer 12 looks up the requested information in the database 18 and then passes the information back to the checkout terminal 14 for output at an appropriate device. Thus, for example, a cashier may scan the UPC code on a can of vegetables at scanner 24. The scanned code is then passed to the server computer 12 with a request for price information, which is looked up in database 18. The price and item identification information is then returned to the terminal 14, which causes the price and item identification information to be displayed on a display 36 and printed onto a paper receipt at printer 38. Depending upon the particular transaction being processed, different sequences of inputs and outputs are exchanged between the checkout terminal 14 and the server computer 12.

The complexity and highly specific nature of the client and server software required to operate a retail checkout network such as the one shown in FIG. 1 creates difficulties in designing a self-checkout terminal to be integrated into an already existing network of retail checkout network.

In a self-checkout terminal, as its name implies, the functions normally performed by a human cashier are instead performed by the retail customer. Some of the peripheral devices on a self-checkout terminal are substantially identical to those in a traditional, cashier-operated terminal. For example, both terminals make use of scanners to scan UPC codes on items to be checked out, as well as printers to print paper receipts.

However, because there is no human cashier to monitor and assist in the transaction, a self-checkout terminal must also include a number of unique hardware and software components. These include modules to provide instructions and cues to the retail customer, as well as security modules that, for example, ensure that the proper item has been scanned. In addition, a self-checkout terminal may include hardware and software components that facilitate remote approvals of purchases that are restricted by age, such as tobacco or alcohol. Thus, the software used to control a self-checkout terminal is typically highly specific to that terminal.

There are currently a number of different environments for networks of cashier operated retail checkout terminals. These include, for example, the IBM 4690 and the NCR MTX environments. In developing retail self-checkout terminals for use in these already existing environments, one approach is to rewrite and adapt the already existing software used in these environments. However, this is a time-consuming and inefficient process, and has to be performed for each separate environment in which it is desired to add self-checkout terminals.

An alternative approach is to develop self-checkout terminals that access the data contained in an already existing network, independently of the software used by the network. However, this approach can lead to pricing errors if different algorithms are used by the self-checkout terminals and by the already existing cashier operated terminals. In such a case, it is possible for the prices charged at the self-checkout terminals to differ from the prices charged at the cashier-operated terminals.

U.S. patent application Ser. No. 09/273,363 filed Mar. 22, 1999, now U.S. Pat. No. 6,856,964, and incorporated by reference in its entirety herein, addresses approaches for integrating a self-checkout terminal into an already existing cashier-operated terminal environment without the need to rewrite already existing code and without the above mentioned risk of pricing errors. In particular, the actual application code that the store is running in its other lanes is integrated into the self-checkout terminal, while isolating the unique self-checkout features into another application. Thus, functionality that was already in the store system was preserved, and new behavior necessary for self-checkout could exist outside the store's current application.

Figure 2:
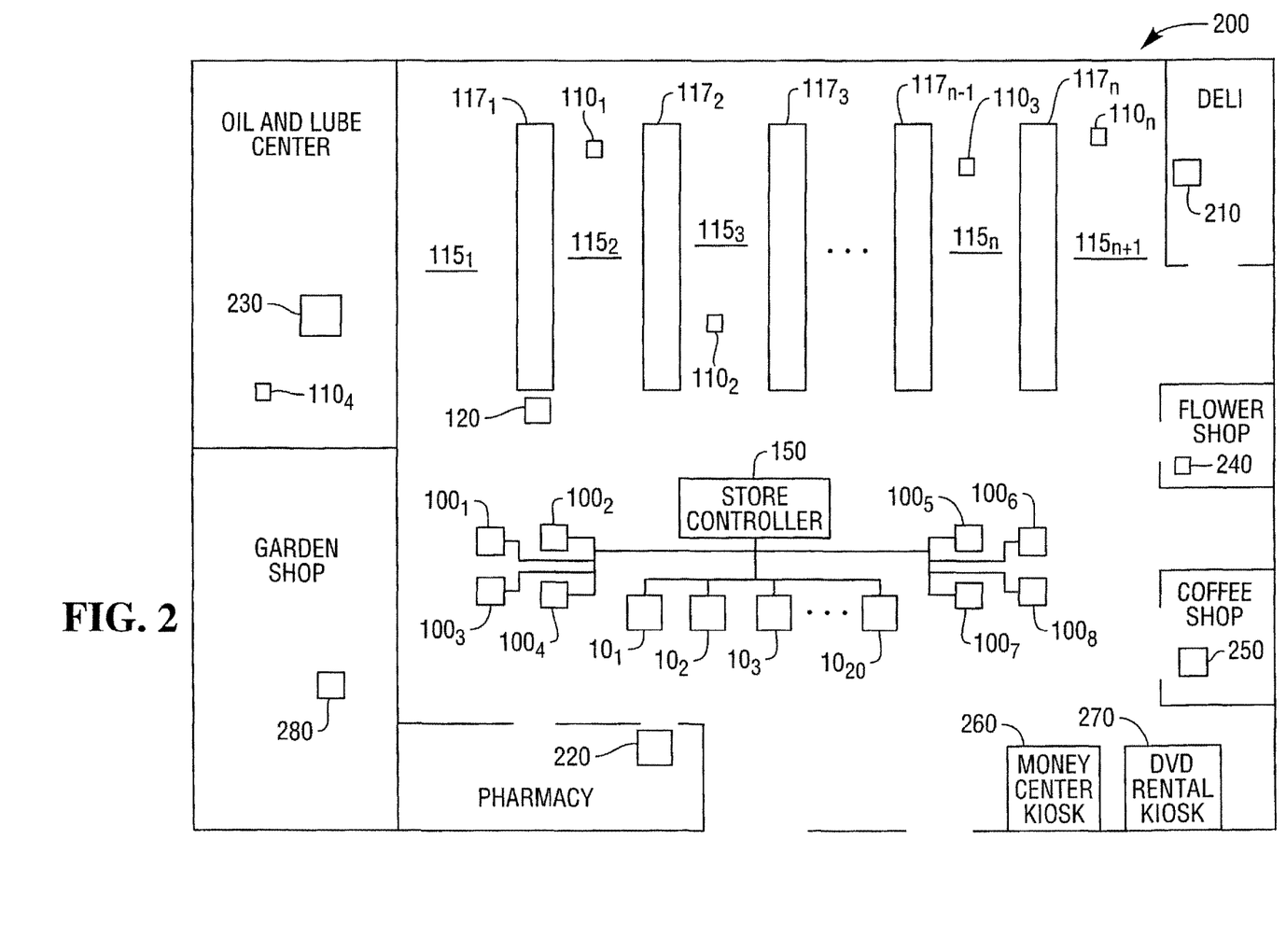
FIG. 2 shows an illustration of a large retail store with a large number of cashier operated checkout terminals, self-service checkout terminals, other store systems, pricing kiosks, and mobile pricing units supported by multiplexed point of sale applications in accordance with the present invention.

FIG. 2 shows an overall store environment or store 200 in which the present invention may be advantageously employed. It will be recognized that while an illustrative store layout is shown for purposes of discussion, other vastly different store layouts may suitably employ the teachings of the present invention. As illustrated, store 200 has 20 checkout lines each having a cashier operated checkout terminal $10_1$, $10_2$ . . . $10_{20}$ (collectively 10). Store 200 has eight self-checkout terminals $100_1$, $100_2$ . . . $100_8$ (collectively 100). All of the terminals 10 and 100 are networked or otherwise able to communicate with store controller 150.

Store 200 also has a deli, pharmacy, oil and lube center, flower shop, and coffee shop. These areas may have their own sales and information terminals, 210, 220, 230, 240 and 250, respectively. Additionally, a money center kiosk 260, a DVD rental kiosk 270 or other kiosks may be found in the store 200.

As is typical, store 200 has a number of aisles $115_1$, $115_2$ . . . $115_n$ and $115_{n+1}$ (collectively 115) and shelves $117_1$, $117_2$ . . . $117_n$ (collectively 117). A price check kiosk 120 is found at an end cap of the shelves 117. It will be recognized that plural price check kiosks may be placed throughout the store 200 if desired. In addition, customer cell phones with a price look up application loaded thereon or dedicated mobile price look up devices provided by the store 200 collectively mobile price check units $110_1$, $110_2$ . . . $110_n$ (collectively 110) are illustrated throughout store 200. In a large, busy store, the number of mobile price check units might be in the hundreds.

To support an in aisle scanning program for such a store with the accurate pricing needed to make the system workable, a very large number of POS instances will be needed if a one to one relationship between POS instances and mobile price check units is provided. The ballpark expense on the order of $100 for a mother board to support a single POS instance may be acceptable in the context of a cashier operated checkout terminal which with peripherals may cost in the range of $3,000-$10,000. While the same may be true in the context of the overall cost of a self-checkout terminal, it may be considered unnecessary or unacceptable in the context of adding 100, 200 or more standalone POS instances. As such, the expense and associated equipment footprint may be a deterrent to adoption of such systems.

Thus, the one to one dedicated solution is not easily scalable in that a large grocery store might have hundreds of in aisle scan devices, dedicated wireless scan devices, cellular smart phones, and the like, active at any point in time and thus need to host a number of POS instances large enough to serve all the customers expected to utilize the system at the store's busiest. This approach can also be challenging since many existing POS systems are not easily run in a server configuration. Even when multiple instances of the POS system may be run on a server, the equipment required to host 100, 200 or more POS instances remains a deterrent to adopting such in aisle scanning solutions.

The present invention dramatically reduces the number of POS instances that are required by recognizing that the average scan time for an in aisle scanning customer is limited by their rate of travel through the store and an average basket size of five to ten items per trip. Assuming ten minutes per shopper visit, the average scan time for a basket size of ten would only be one scan per minute, thus grossly underutilizing a dedicated POS instance that can typically sell items at a rate of five to ten items per second.

As addressed further below, the present invention applies the principle of time multiplexing to the POS application allowing each POS instance to handle multiple in aisle scanning devices.

The invention has two basic forms of implementation. The first approach is suspend and resume and the second is void, restart and resell. For the suspend and resume implementation, the individual transaction context is maintained on the store POS controller using a suspend operation and later resumed when an item is to be scanned for a particular in aisle shopper. That provides the correct transaction context for accurately pricing the item sold. After the item sale and display of the item details and pricing information, the transaction is suspended back to the store controller freeing up the POS instance for the next incoming in aisle item scan.

Alternately, the in aisle scanning system implementation maintains the item history of each shopper's in aisle transactions. When a new item is scanned by an in aisle scan shopper, the POS is reset. The previous transaction is voided. A new transaction is started and each item in the stored item list is resold through the POS to create the correct transaction context for the most recent item to be sold and therefore correctly priced. Either the suspend and resume session storage, item list storage or an alternative thereto is required. While both are not necessary, it may be advantageous for the software and system to be constructed so that both approaches are supported thereby making the approach retrofittable or compatible with POS systems compatible with either approach.

Either of these implementations may be advantageously employed to allow a few POS instances to handle many in aisle scanning sessions. For example, we might imagine one hundred shoppers using in-aisle scanning. Historical data suggests for some grocery store formats that six items per transaction is typical. If we estimate the time the shopper spends in the aisles picking and scanning as five minutes, then we have an aggregate scan load of: (100 shoppers*6 items)/300 seconds=2 items/second. Now assuming an instance of the POS can sell an item in 200 milliseconds (ms), start a new transaction in 100 ms and void a transaction in 100 ms, then the capacity of each instance of the POS for the option of rescanning the item list is approximately: 1 item/(100 ms (Start Trans)+6 items*200 ms+100 ms (Void Trans))=0.71 items/sec. It follows then that a store configured with three POS systems would have a combined capacity of 2.13 items per second, or, in other words, enough capacity for all the in aisle scanner application users. If the suspend and resume approach is used, then the capacity of the POS is no longer dependent on the number of items in the transaction. Assuming the POS can resume a transaction in 200 ms and suspend a transaction in 200 ms, then the capacity is given as: 1 item/(200 ms (resume)+200 ms (single item scan)+200 ms (suspend)=1.6 items/sec. It follows then that a store configured with two POS systems would provide a combined capacity of 3.2 items per second, more than enough capacity for all the in aisle scanner application users. In either case, the number of POS instances required to support the one hundred in aisle shoppers is a small fraction of the 100 POS instances required using a one to one shopper to POS model.

Figure 3:
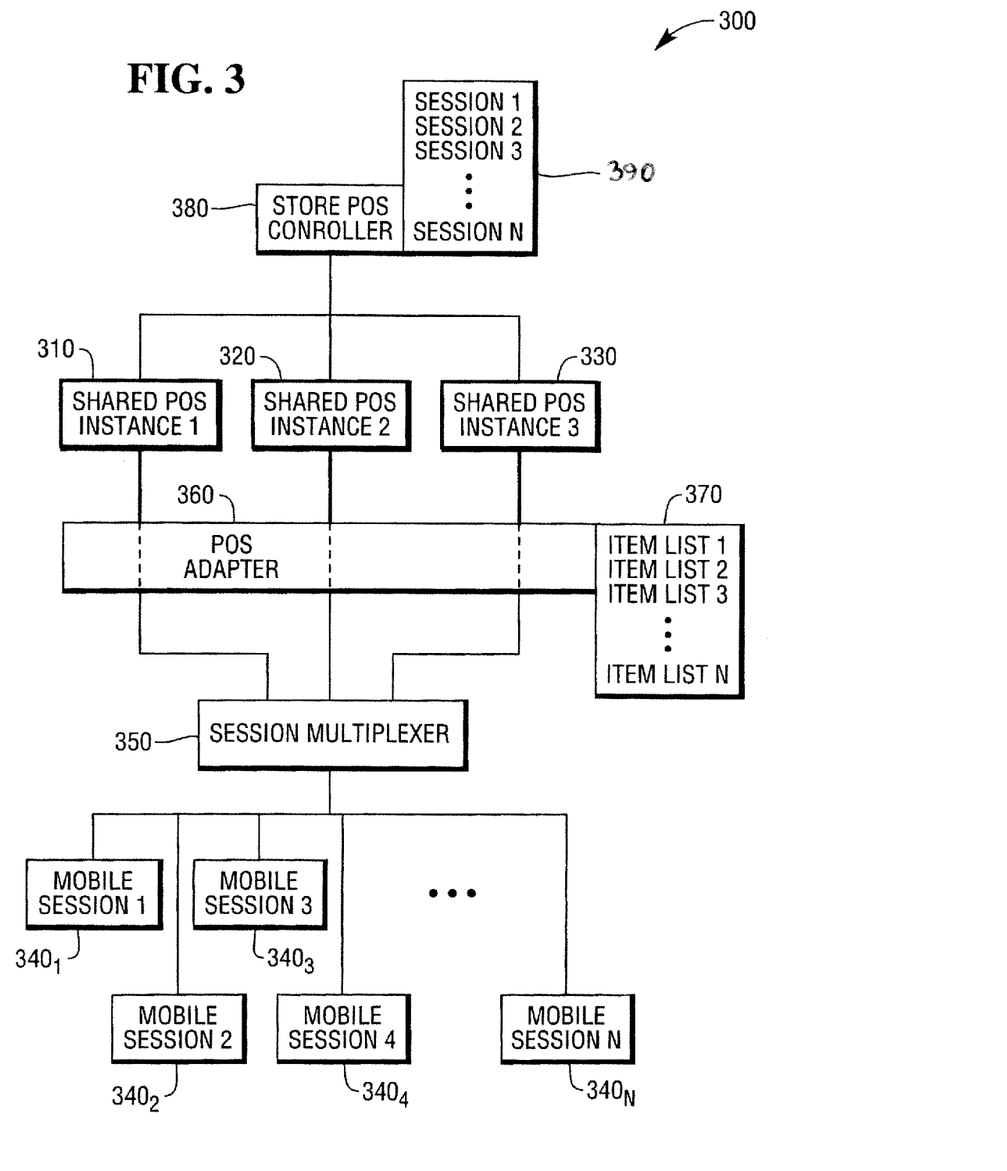
FIG. 3 shows an illustration of a multiplexing approach in accordance with the present invention.

Turning to FIG. 3, one embodiment of a multiplexing system 300 for sharing POS instances 310, 320 and 330 by plural mobile sessions $340_1$, $340_2$, . . . $340_n$ (collectively 340) is shown. Each of the sessions 340 connect via wifi or another communication mechanism to a session multiplexer 350 that then locates the next available POS instance and attaches the mobile session to that PUS instance. The session multiplexer 350 multiplexes the various requests of the mobile sessions 340 on a time multiplexed basis through POS adapter 360 which routes the time multiplexed requests to the next available one of the shared POS instances 310, 320 or 330. The attachment of the mobile session to the POS instance is maintained until the scanned code is provided by the mobile application and a price is returned to that mobile application, then, the attachment is dissolved and the POS instance is freed for another mobile session to attach.

The POS adapter 360 may suitably provide embedded support to allow the POS application instances to be started, stopped and otherwise managed. For a POS not having suspend and resume capability, a list 370 of scanned items with no details, pricing or other transaction information is maintained on the POS adapter 360. When the session multiplexer 350 attaches a POS instance to handle an incoming scan, then the POS adapter 360 starts a new transaction on the POS instance and iteratively scans each of the previous item codes of that shopper's mobile session into the POS creating the correct context to then scan the most recently received item scan from the mobile device. After the most recent scan is priced and details are returned to the mobile device, the transaction on the POS instance is cancelled or destroyed thereby freeing up the POS instance to start a new transaction for the next mobile scan which is received.

To support suspend and resume operation, a store POS controller 380 maintains session storage for a session list 390 with a $session_1$, $session_2$, . . . $session_n$ for each of the mobile sessions 340. A transaction is started on the POS controller 380 for each mobile instance. When an item scan comes in from a mobile device, the session multiplexer 350 attaches the next available POS instance 310, 320 or 330, and the POS adapter 360 directs the shared POS instance to resume the correct transaction for that mobile application based on a loyalty token previously scanned or other derived identification of the mobile device. After the transaction is resumed, the scan is processed and the item details and pricing returned to the mobile application. Then, the transaction is again suspended by the store POS controller 380.

As illustrated in FIG. 3, three shared POS instances 310, 320 and 330 are shown for ease of illustration; however, it will be recognized that a larger number may be employed as desired for a particular store context. While the shared POS instances 310, 320 and 330 may be dedicated to supporting mobile sessions 340 as shown in FIG. 3, it will be recognized that the average customer using self-checkout terminals such as the self-checkout terminals $100_1$, $100_2$, . . . $100_8$ of FIG. 2 scans items much more slowly than an experienced and skilled store employee using a cashier operated POS terminal, such as one of the terminals $10_1$, $10_2$, . . . $10_{20}$. Thus, a point of sale instance used for self-checkout may be time multiplexed to also support mobile sessions. Further, at any given time, one or more self-checkout terminals or assisted checkout terminals may not be in use at all so that POS instances for not in use terminals may be utilized to support mobile sessions. Similarly, point of sale terminals in the deli 210, pharmacy 220, or flower shop 240, for example, may also be lightly used during many hours of normal store operation so they too could be multiplexed as taught herein.

In many cases, an existing POS instance such as one employed in an existing self-checkout terminal or an existing cashier operated terminal may not readily be available as an embedded business object to be used in the multiplexed pricing engine. In such cases, a POS human interface may need to be replaced with a wrapper that allows the POS instance to be run as an embedded component of a larger software system. In one embodiment, the present invention may be advantageously employed in conjunction with store systems and processes as described in the above identified cross-referenced application which has been incorporated by reference herein in its entirety. This approach advantageously allows even POS applications not intended to work as embedded applications to be deployed in this manner.

If spare capacity cannot be guaranteed from the available store POS instances then a dedicated server may be used to host the necessary number of POS instances to insure adequate response times are maintained for the in aisle scanning sessions.

Figure 4:
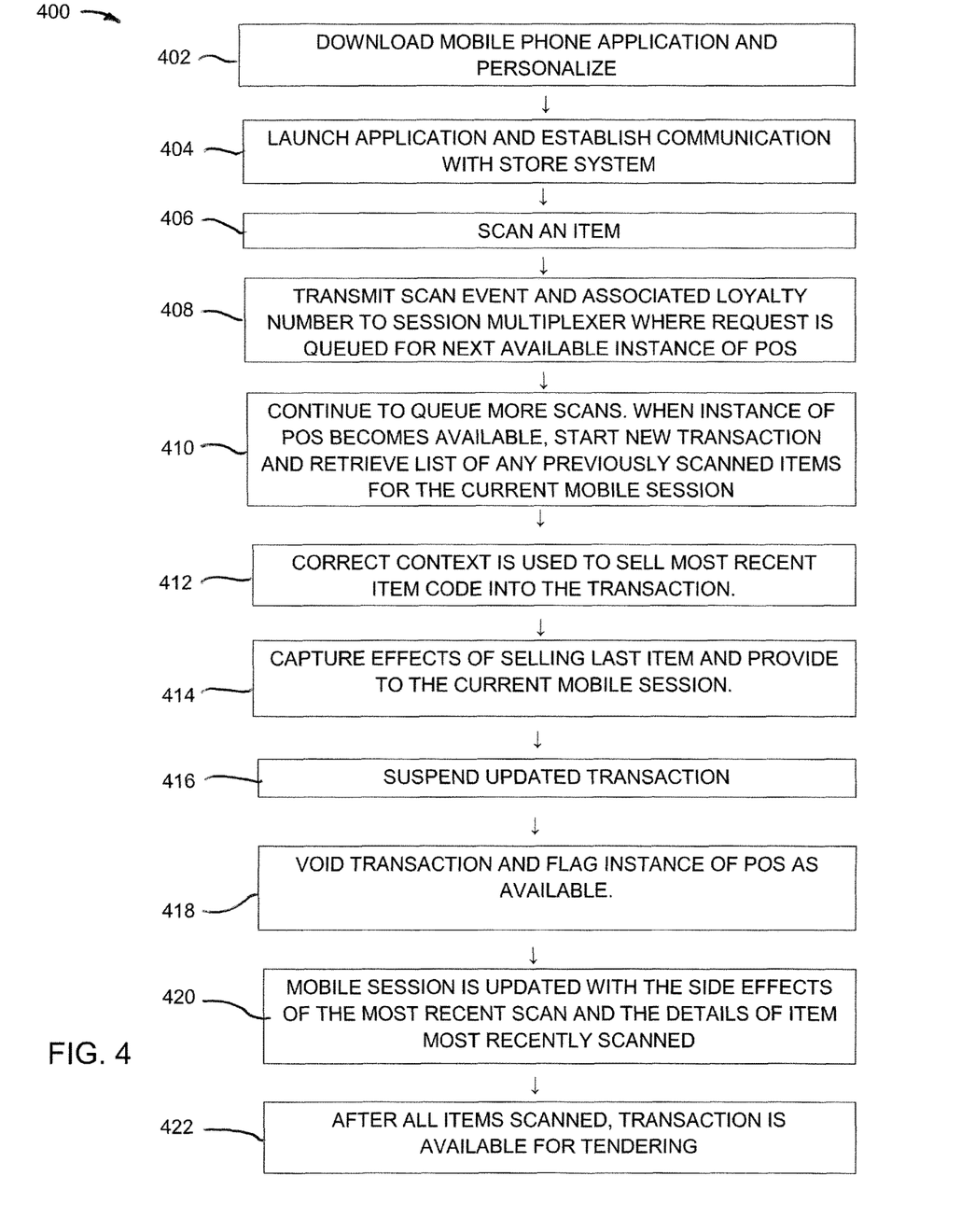
FIG. 4 shows a first process of multiplexing point of sales instances in accordance with an embodiment of the invention.

FIG. 4 shows one process 400 of multiplexing POS instances in accordance with the present invention. In step 402, a customer wanting to do price checking or in aisle scanning downloads a mobile phone application onto a mobile device, such as a mobile phone, and that mobile application is personalized with a shopper loyalty number or other customer or device identification, such as a phone number, MAC address, or other cellular phone or device identifier. Alternatively, a store issued scanning device may be utilized by the customer. Of course, while a customer is addressed here, it is assumed that many customers will choose to utilize in aisle scanning. In step 404, in the retail store, the application is launched and communication is established with a store system, such as the multiplexing system 300 which incorporates the necessary communication circuitry, or with a store communication server as shown in FIG. 4 of the above cross-referenced application. Communication may advantageously utilize wifi or another mode of wireless communication. For example, a first mobile scanning device 110$_1$ begins mobile session 340$_1$ by establishing a wifi communication link with the session multiplexer 350. Other customers subsequently begin mobile sessions 340$_2$, 340$_3$, and so on.

As part of the mobile session 340$_1$, in step 406, an item is scanned in the store aisle by the customer, using the camera of the mobile phone, for example. In step 408, the scan event and the associated shopper loyalty number are transmitted to session multiplexer 350 where the request is queued in a buffer for the next available POS 310, 320 or 330. While more scans are queued for other customers or the first customer in step 410, when a POS becomes available, for example POS 310, a new transaction associated with the customer loyalty number is started by POS adapter 360, and any existing list 370 is retrieved for any previously scanned items for the current mobile session. The data for any previously scanned items provides context for the newly scanned item.

In step 412, as the transaction now contains the complete and correct context, the most recent item code received from the mobile session can be accurately sold into the transaction. Thus, in step 414, the effects of selling the last item, such as changes to previously communicated item descriptions, prices, discounts and the like, are captured from the POS and provided to the mobile session after which the details for the most recent item scanned are provided.

In step 416, an updated item code list 370 is stored in list storage to be used if future scans are received. The transaction is voided and the POS 310 is now flagged as available to price the next queued item scan code from whatever mobile session is next in the queue and the process 400 loops back to step 410 and steps 410-416 repeat.

In step 420, a particular mobile session, such as 340$_1$, is updated with the side effects of the most recent scan on previous items sold and the details of the item most recently scanned. If other items continue to be scanned by the first customer, the process 400 loops back to step 406.

After all items have been scanned by the customer, in step 422, the transaction is available for tendering at the payment station or may be directly paid via the mobile session if such payment is permitted.

Figure 5:
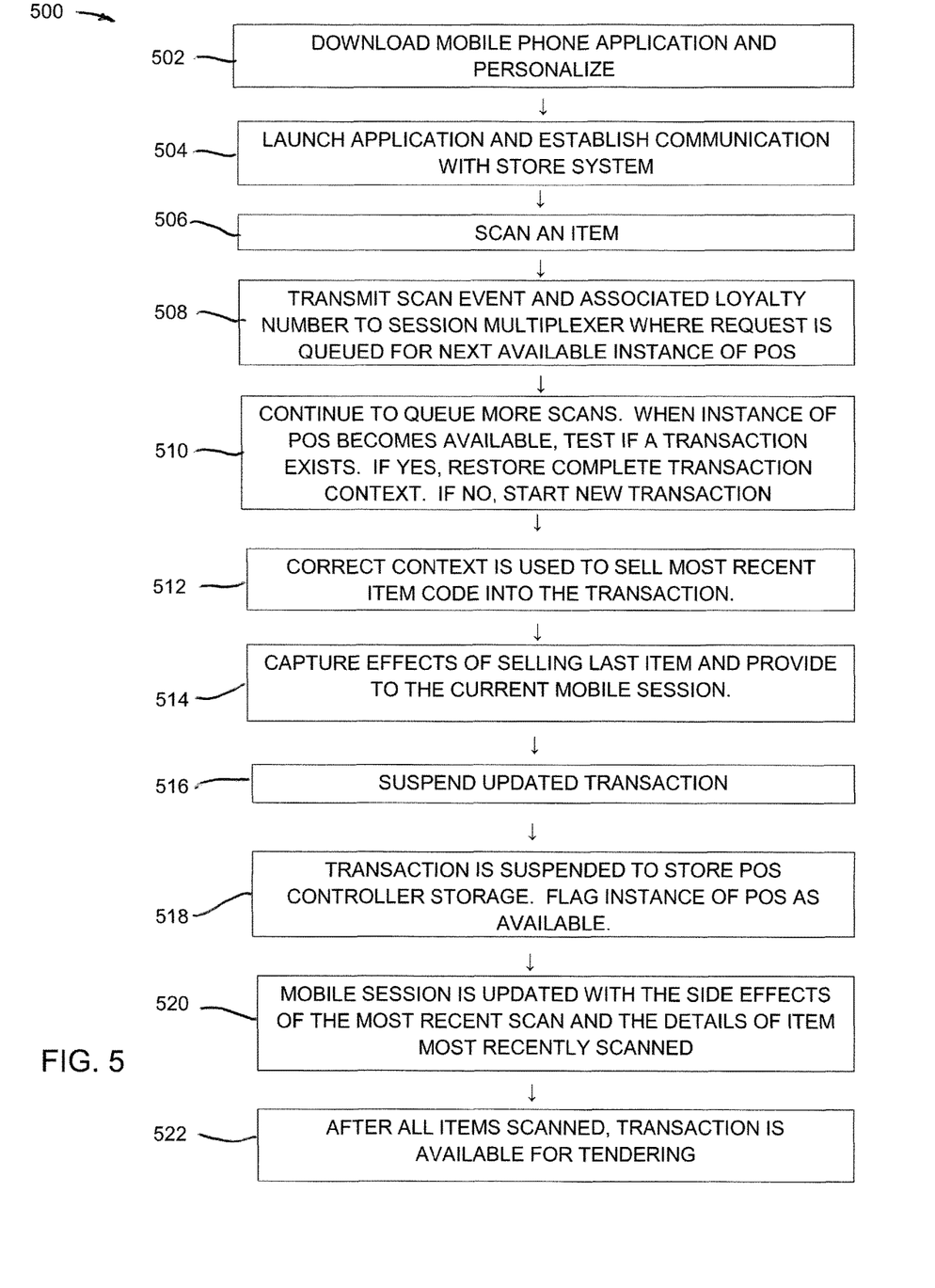
FIG. 5 shows a second process of multiplexing point of sales instance in accordance with an embodiment of the invention.

FIG. 5 shows a further process 500 of multiplexing POS instances in accordance with the present invention. In step 502, a customer wanting to do price checking or in aisle scanning downloads a mobile phone application onto a mobile device, such as a mobile phone, and that mobile application is personalized with a shopper loyalty number or other customer identification. Alternatively, a store issued scanning device may be utilized by the customer. Of course, while a customer is addressed here, it is assumed that many customers will choose to utilize in aisle scanning. In step 504, in the retail store, the application is launched and communication is established with a store system, such as the multiplexing system 300 which incorporates the necessary communication circuitry, or with a store communication server as shown in FIG. 5 of the above cross-referenced application. Communication may advantageously utilize wifi or another mode of wireless communication. For example, a first mobile scanning device 110$_1$ begins mobile session 340$_1$ by establishing a wifi communication link with the session multiplexer 350. Other customers subsequently begin mobile sessions 340$_2$, 340$_3$, and so on.

As part of the mobile session 340$_1$, in step 506, an item is scanned in the store aisle by the customer, using the camera of the mobile phone, for example. In step 508, the scan event and the associated shopper loyalty number are transmitted to session multiplexer 350 where the request is queued in a buffer for the next available POS 310, 320 or 330. While more scans are queued for other customers or the first customer in step 510, when a POS becomes available, for example POS 310, POS adapter 360 tests if a transaction exists for the particular mobile session, such as mobile session 340$_1$. If yes, the store POS controller 380 is directed to restore the complete transaction context from store POS controller storage 390. If no, a new transaction is started.

In step 512, as the transaction now contains the complete and correct context, the most recent item code received from the mobile session can be accurately sold into the transaction. Thus, in step 514, the effects of selling the last item, such as changes to previously communicated item descriptions, prices, discounts and the like, are captured from the POS and provided to the mobile session after which the details for the most recent item scanned are provided.

In step 516, the POS adapter 360 directs the POS instance in use to suspend the updated transaction. In step 518, the transaction is suspended by store POS controller 380 which stores the suspended transaction data to store POS controller storage 390 and the POS instance is flagged as available to price the next queued item scan code from any mobile session 340$n$ next on the queue, and the process 500 loops back to step 510 and steps 510-516 repeat.

In step 520, a particular mobile session, such as $340_1$, is updated with the side effects of the most recent scan on previous items sold and the details of the item most recently scanned. If other items continue to be scanned by the first customer, the process 500 loops back to step 506.

After all items have been scanned by the customer, in step 522, the transaction is available for tendering at the payment station or may be directly paid via the mobile session if such payment is permitted.

As addressed above, aspects of the present invention dramatically reduces the number of POS instances required to support a large scale store in aisle scanning system and still insures that correct and current item pricing is provided within performance bounds. Depending on the POS performance, 200 in aisle sessions might be handled by five to ten POS instances substantially reducing the back-office hardware requirements compared with hosting 200 POS instances dedicated to a session on a one to one basis. The system also allows the handling of coupons and other loyalty related media during the itemization, as a customer can scan their coupons as they walk the aisles and place items in their baskets or carts. The system also correctly handles exceptions like age restricted items because those decisions are correctly made based on the context of the private transaction of the in aisle shopper.

Aspects of the present invention provide a large degree of flexibility. For example, in an alternative approach, in aisle scanning may only be supported during periods of moderate or low shopping activity when store personnel are available to spot check customer baskets of self-scanned items. In such cases, only existing underutilized POS instances may be multiplexed to support mobile sessions.

While the present invention is disclosed in the context of a presently preferred embodiment, it will be recognized that a wide variety of implementations may be employed by persons of ordinary skill in the art consistent with the above discussion and the claims which follow below.

I claim:

1. A system for multiplexing plural shared point of sale (POS) instances for shared use by a plurality of mobile devices connecting to respective POS instances of the plural shared POS instances through mobile communication sessions, the system comprising:
    a wireless communications mechanism for wirelessly communicating with the plurality of mobile devices in the mobile communication sessions and for receiving mobile scan requests from the mobile devices;
    a session multiplexer that receives incoming ones of the mobile scan requests and associated loyalty tokens and queues the incoming mobile scan requests in a buffer by mobile communication session, dequeues the incoming mobile scan requests from the buffer by mobile communication session, and multiplexes the dequeued mobile scan requests by mobile communication session to available POS instances from among the plural shared POS instances; and
    a POS adapter that presents a standardized interface and the POS adapter provides support that allows each POS instance of the plural shared POS instances to perform item sale and related operations during transactions between the mobile devices and the POS instances;
    wherein when a POS instance from among the plural shared POS instances is available, the POS adapter starts a particular one of the transactions with that available POS instance, for a particular mobile communication session of the mobile communication sessions, and associates the particular transaction with one of the loyalty tokens associated with the particular mobile communication session, the POS adapter iteratively scans previous scan requests for the particular mobile communication session and then scans a most-recently received dequeued scan request of the multiplexed dequeued mobile scan requests associated with that particular session, for obtaining pricing information for each scan request of that particular session, and the POS adapter forwards the pricing information for each scan request of that particular session to a corresponding mobile device associated with that particular session and cancels the particular transaction when the pricing information for the most recently received dequeued scan request is received by the mobile device thereby freeing up the POS session for a next scan request, and
    wherein each instance from the plural shared POS instances is an occurrence of a POS application from a plurality of POS applications and some of the POS applications are hosted on client terminals and at least one POS application is hosted on a server.

2. The system of claim 1 wherein at least two of the plural shared POS instances are shared by a substantially greater number of the mobile communication sessions.

3. The system of claim 1 wherein the scan requests are performed in aisle and using the mobile devices having a scanning application downloaded thereon and personalized with a shopper identifier or other wireless scanning devices associated with a shopper identifier.

4. The system of claim 3 wherein the shopper identifier is one of the shopper loyalty tokens.

5. The system of claim 4 wherein the scanning application supports bar code scanning and each bar code scanned comprises a scan request, and a first scan request and the shopper loyalty token are transmitted via Wi-Fi to the session multiplexer and queued for the next available POS instance.

6. The system of claim 1 further comprising:
    list storage of the previous scan requests for any current mobile communication session from the mobile communication sessions.

7. The system of claim 1 wherein at least one shared POS instance from the plural shared POS instances is a POS instance for a cashier assisted checkout terminal or a self-service checkout terminal that is not currently in use.

8. The system of claim 1 wherein correct context information is maintained for any of the transactions involving multiple items.

9. A method for multiplexing plural shared point of sale (POS) instances for shared use by a plurality of mobile devices connecting through mobile communication sessions comprising:
    wirelessly communicating, via a wireless communications mechanism, with the plurality of mobile devices in the mobile communication sessions and receiving, via the wireless communications mechanism, mobile scan requests from the mobile devices;
    receiving, by a session multiplexer, incoming ones of the mobile scan requests and associated loyalty tokens;
    queueing, by the session multiplexer, the incoming mobile scan requests in a buffer by mobile communication session,
    dequeuing, by the session multiplexer, the incoming mobile scan requests from the buffer by mobile communication session,
    multiplexing, by the session multiplexer, the dequeued mobile scan request by mobile communication session to available POS instances from among the plural shared POS instances for conducting transactions between the mobile devices and the shared POS instances;

presenting, by a POS adapter, a standardized interface, and providing support that allows each POS instance of the plural shared POS instances to perform item sale and related operations during transactions between the mobile devices and the POS instances;

upon a POS instance from among the plural shared POS instances becoming available, performing by the POS adapter the steps of:

starting a particular one of the transactions with the available POS instance for a particular mobile communication session of the mobile communication sessions;

associating the particular transaction with one of the loyalty tokens associated with the particular mobile communication session;

iteratively scanning previous scan requests for the particular mobile communication session;

scanning a most-recently received dequeued scan request of the multiplexed dequeued mobile scan requests associated with that particular session, for obtaining pricing information for each scan request of that particular session forwarding the pricing information for each scan request of that particular session to a corresponding mobile device associated with that particular session; and canceling the particular transaction when the pricing information for the most-recently received dequeued scan request is received by the mobile device thereby freeing up the POS session for a next scan request;

wherein each POS instance from the plural shared POS instances is an occurrence of a POS application from a plurality of POS applications and some of the POS applications are hosted on client terminals and at least one of the POS applications is hosted on a server.

10. The method of claim 9 further comprising:

employing at least two POS instances from the plural shared POS instances which are shared by a greater number of the mobile communication sessions.

11. The method of claim 9 further comprising: utilizing mobile cell phones having a scanning application downloaded thereon and personalized with a shopper identifier to perform in aisle scanning as the mobile devices.

12. The method of claim 11 comprising: utilizing one of the loyalty token as the shopper identifier.

13. The method of claim 12 wherein the scanning application supports bar code scanning and a bar code scanned comprises a scan request, and wherein the scan request and the loyalty token are transmitted via Wi-Fi.

14. The method of claim 9 further comprising:

utilizing a particular POS instance from the plural shared POS instances for a cashier assisted checkout terminal or a self-service checkout terminal that is not currently in use as at least one shared POS instance from the plural shared POS instances.

15. The method of claim 9 further comprising:

maintaining correct context information for any of the transactions a involving multiple items.

* * * * *